United States Patent
Takai et al.

(10) Patent No.: US 10,162,601 B2
(45) Date of Patent: Dec. 25, 2018

(54) METHOD FOR ANALYZING IMPACT OF CHANGE AND ITS APPARATUS

(71) Applicant: Hitachi, Ltd., Chiyoda-ku, Tokyo (JP)

(72) Inventors: Yasunari Takai, Tokyo (JP); Katsumi Kawai, Tokyo (JP); Yusuke Jin, Tokyo (JP); Ryosuke Tsuchiya, Tokyo (JP); Ryota Mibe, Tokyo (JP); Tarou Sakisaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 49 days.

(21) Appl. No.: 15/400,302

(22) Filed: Jan. 6, 2017

(65) Prior Publication Data

US 2018/0081637 A1 Mar. 22, 2018

(30) Foreign Application Priority Data

Sep. 20, 2016 (JP) .................. 2016-183094

(51) Int. Cl.
- *G06F 9/44* (2018.01)
- *G06F 8/20* (2018.01)
- *G06F 8/77* (2018.01)
- *G06F 11/36* (2006.01)
- *G06F 17/30* (2006.01)

(52) U.S. Cl.
CPC ............... *G06F 8/20* (2013.01); *G06F 8/77* (2013.01); *G06F 11/3636* (2013.01); *G06F 17/3053* (2013.01)

(58) Field of Classification Search
USPC ...................................................... 717/104
See application file for complete search history.

(56) References Cited

U.S. PATENT DOCUMENTS

| | | | |
|---|---|---|---|
| 6,256,773 B1* | 7/2001 | Bowman-Amuah | G06F 8/71 707/999.202 |
| 6,536,037 B1* | 3/2003 | Guheen | G06F 8/71 703/2 |
| 9,378,065 B2* | 6/2016 | Shear | G06F 9/5072 |
| 2004/0111410 A1* | 6/2004 | Burgoon | G06F 17/30536 |
| 2005/0114829 A1* | 5/2005 | Robin | G06Q 10/06 717/101 |

(Continued)

FOREIGN PATENT DOCUMENTS

JP 2014-232505 A 12/2014

*Primary Examiner* — Chameli Das
(74) *Attorney, Agent, or Firm* — Crowell & Moring LLP

(57) ABSTRACT

In order to realize a method for analyzing an impact of change with less misidentification and missing, an apparatus for analyzing an impact of change for investigating a change impact range caused by a change in requirements and specifications includes: a storage unit that stores design information and keywords; an input unit that inputs a trace condition including the design information representing an origin of a change impact analysis in design conditions stored in the storage unit and the keywords stored in the storage unit; a CPU that receives the trace condition including the design information representing the origin of the change impact analysis and the keywords from the input unit, and calculates an influence score representing a probability of the influence caused by the change in the requirements and the specifications for each of the design information; and a display unit that outputs a result calculated by the CPU.

10 Claims, 16 Drawing Sheets

(56) References Cited

U.S. PATENT DOCUMENTS

| | | | |
|---|---|---|---|
| 2008/0059977 A1* | 3/2008 | Brown | G06F 8/71 |
| | | | 719/316 |
| 2008/0103859 A1* | 5/2008 | Yokota | G06Q 10/063118 |
| | | | 705/7.28 |
| 2013/0054564 A1* | 2/2013 | Smyros | G06F 17/30613 |
| | | | 707/711 |
| 2014/0229164 A1* | 8/2014 | Martens | G06F 17/241 |
| | | | 704/9 |
| 2015/0026105 A1* | 1/2015 | Henrichsen | G06N 5/04 |
| | | | 706/12 |
| 2016/0034525 A1* | 2/2016 | Neels | G06F 17/30389 |
| | | | 707/737 |
| 2018/0052994 A1* | 2/2018 | Iyer | G06F 21/552 |

* cited by examiner

F I G. 1
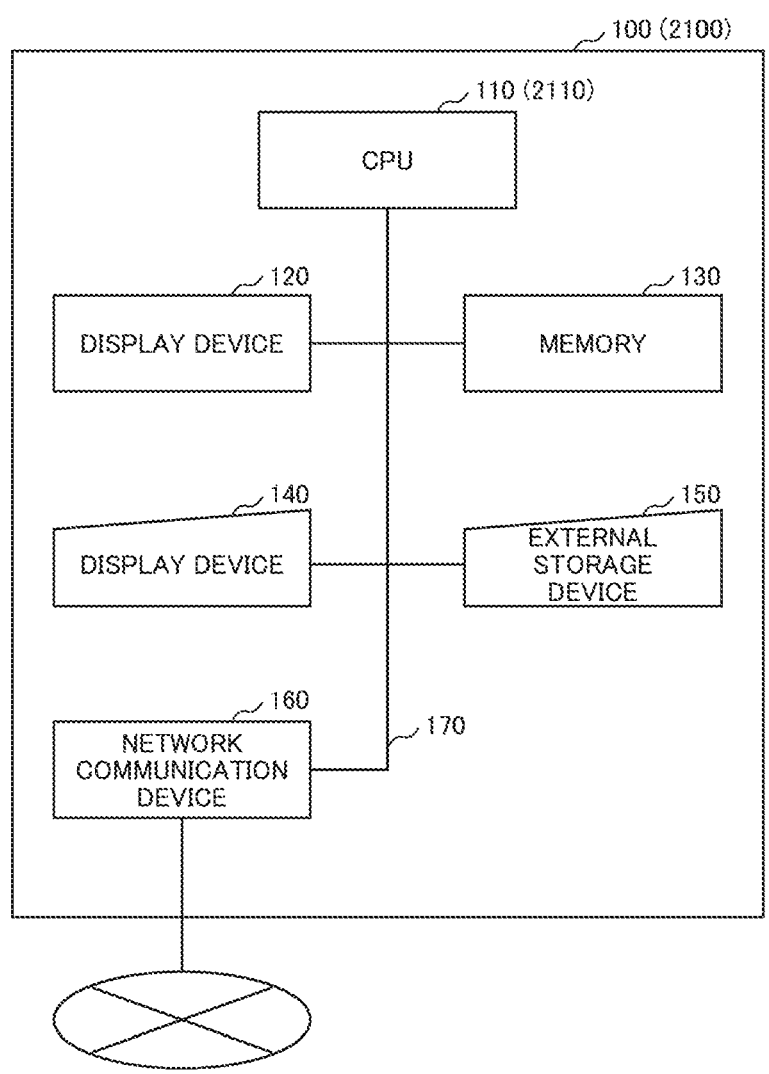

F I G. 2
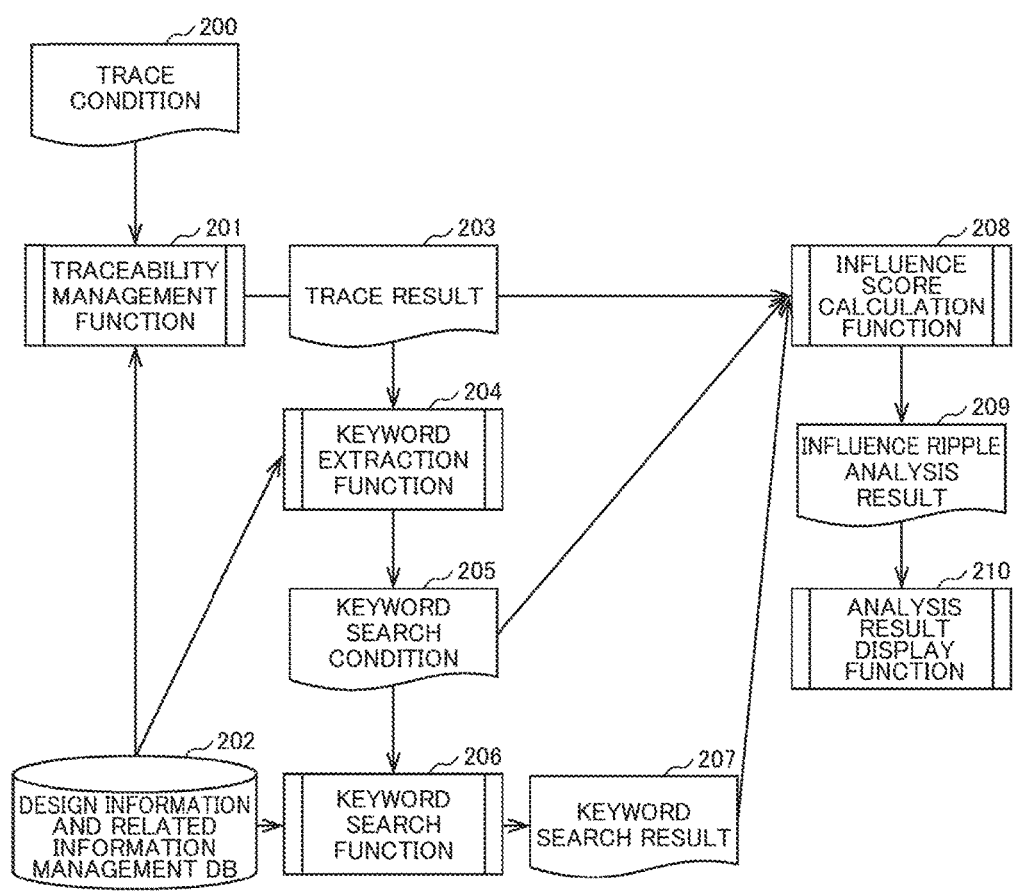

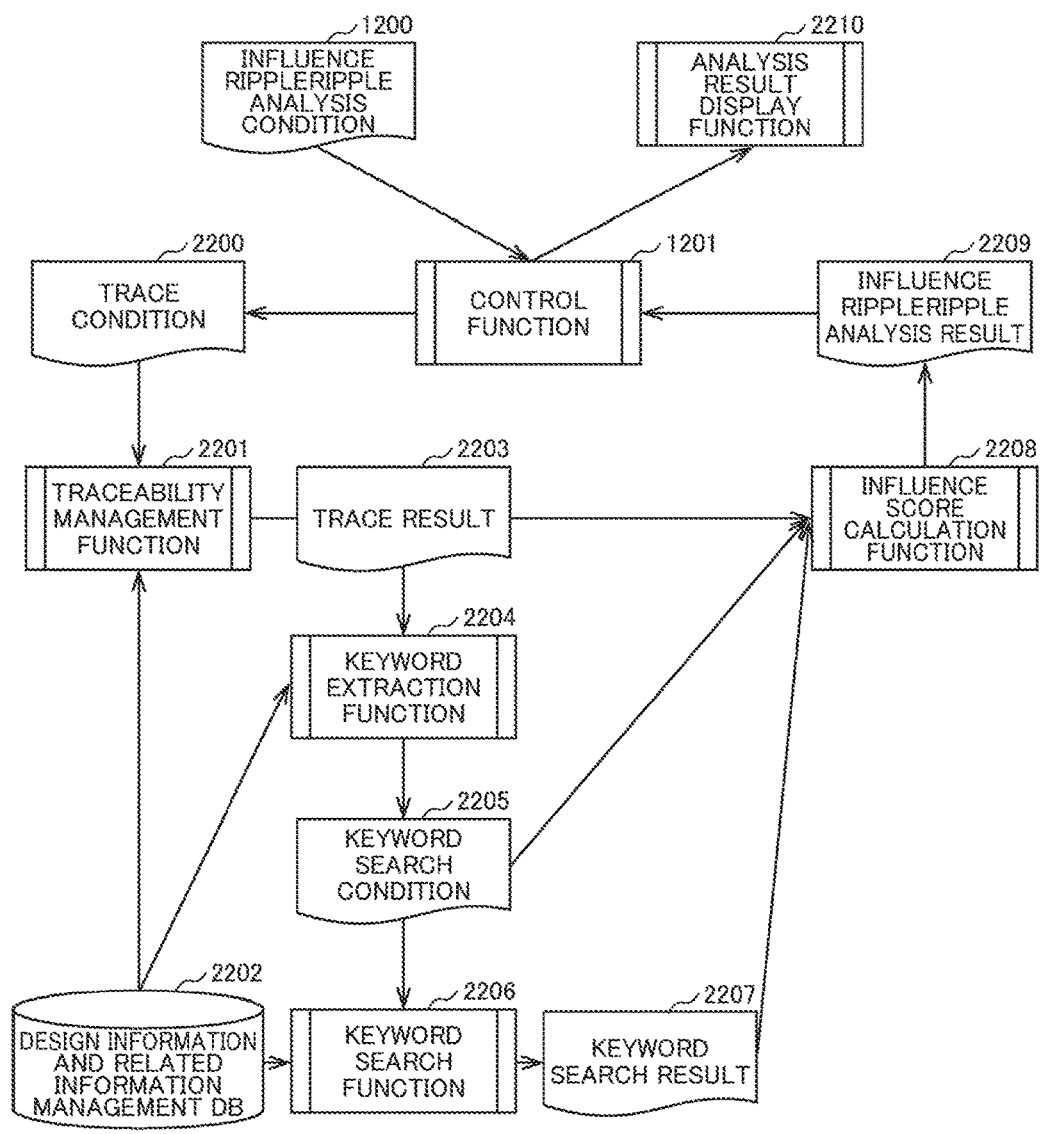
F I G . 1 2

F I G. 1 6

| NO. | INFLUENCE SCORE | DESIGN INFORMATION | FILE NAME |
|---|---|---|---|
| 1 | 96.8 | aaa. bbb | xxx. xlsx |
| 2 | 85.2 | bbb | bbb1. xlsx |
| 3 | 83.3 | aaa1 | aaa1. xlsx |
| 4 | 79.8 | aaa2 | aaa2. xlsx |
| 5 | 71.0 | bbbx | bbb2. xlsx |
|  |  |  |  |
| 6 | 55.1 | ccc | ccc. xlsx |

INFLUENCE SCORE THRESHOLD : 60.0

METHOD FOR ANALYZING IMPACT OF CHANGE AND ITS APPARATUS

BACKGROUND

The present invention relates to a method for analyzing an impact of change for investigating a change impact range caused by a change in requirements and specifications in a system development, and an apparatus therefor.

When a change occurs in requirements and specifications during a system development, an impact of change is analyzed for the purpose of investigating requirements and specifications required to be changed in association with such a change. As methods for analyzing the impact of change, there are a method using a traceability management and a method using a keyword search.

An apparatus for analyzing the impact of change using the traceability management has been disclosed in Japanese Patent Application Laid-Open No. 2014-232505 (Patent Document 1). A column "abstract" of Patent Document 1 discloses "an inter-item relation creation support apparatus that enters data of a product and produces a relation between respective items of the product includes a term analysis unit that analyzes a description of items of the product data and compiles a term list that puts terms extracted from the items together; a relation extraction unit that extracts information on which of the terms in the term list each item is related to, and creates a relation list that recites the terms used in each item for each product; a relation analysis unit that analyzes the relation list and creates a traceability matrix indicative of the relationship between the items having the terms commonly used between the product data; and a relation display unit that displays the traceability matrix in a predetermined system. In contrast, the device using the keyword search includes software such as grep.

SUMMARY

In the change impact analysis using a technique disclosed in Patent Document 1 described above, there is a fact (misidentification) that the requirements and the specifications which are not originally influenced are included in a result, and a fact (missing) that the requirements and the specifications which are originally influenced are not included in the result.

After the change impact analysis, the details of a specific influence are examined. However, because of a time consuming work, if there are a large number of erroneous specifications, a development cost is remarkably increased. In addition, there is a possibility that the missing leads to the omission of reflection of the influence caused by a change in the requirements and the specifications, and remarkably deteriorates a system quality.

Under the above circumstances, the present invention has address the above difficulties of the related art and aims at providing a method for analyzing an impact of change using a keyword search based on a trace result for realizing a change impact analyzing method that reduces misidentification and missing, and an apparatus for the method.

In order to address the above problem, according to the present invention, there is provided an apparatus for analyzing an impact of change for investigating a change impact range caused by a change in requirements and specifications, including: a storage unit that stores design information and keywords; an input unit that inputs a trace condition including the design information representing an origin of a change impact analysis in design conditions stored in the storage unit and the keywords stored in the storage unit; a CPU that receives the trace condition including the design information representing the origin of the change impact analysis and the keywords from the input unit, and calculates an influence score representing a probability of the influence caused by the change in the requirements and the specifications for each of the design information; and a display unit that outputs a result calculated by the CPU.

Moreover, in order to address the above problem, according to the present invention, there is provided a method for analyzing an impact of change for investigating a change impact range caused by a change in requirements and specifications, including: inputting a trace condition including design information representing an origin of a change impact analysis in design conditions stored in a storage unit and keywords stored in the storage unit from an input unit to a CPU; calculating an influence score representing a probability of an influence caused by a change in the requirements and the specifications on the basis of the trace condition including the design information representing the origin of the change impact analysis and the keywords input from the input unit for each of the design information in the CPU; and outputting a result calculated by the CPU to a display unit.

Further, in order to address the above problem, according to the present invention, there is provided a method for analyzing an impact of change for investigating a change impact range caused by a change in requirements and specifications with the use of a computer, including: inputting a trace condition including design information representing an origin of a change impact analysis to the computer to obtain a set of relation source design information and relation destination design information included in the design information as a trace result; extracting the keyword from the trace result to create the keyword search condition, extracting the keyword from the trace result to calculate a search keyword score that is a feature value indicating whether the extracted keyword is specific to the trace result, or not, is calculated; searching the design information with the use of the keyword search condition to obtain the design information meeting the keyword search condition as a keyword search result; calculating the influence score representing the probability of the influence for each of the design information according to the trace result, the search keyword score, and the keyword search result; and outputting a change impact analysis result including the design information and the influence score from the computer.

According to one aspect of the present invention, the method for analyzing the change impact with less misidentification and missing and the device for the method can be realized by the keyword search based on the trace result.

In addition, the change impact range results with less misidentification and missing are obtained by the combination of the trace result with the keyword search result obtained by using the keyword high in relation with the origin design information included in the trace result.

Further, since the design information can be sorted in the order from higher in the probability of influence, even if the man-hours of the change impact analysis is limited, specific influence details can be efficiently considered.

These features and advantages of the invention will be apparent from the following more particular description of preferred embodiments of the invention, as illustrated in the accompanying drawings.

BRIEF DESCRIPTION OF THE DRAWINGS

FIG. 1 is a block diagram illustrating an example of a hardware configuration according to a first embodiment of the present invention;

FIG. 2 is a block diagram illustrating an example of a function block according to the first embodiment of the present invention;

FIG. 12 is a block diagram illustrating an example of a function configuration of a change impact analysis device having a control function according to a second embodiment of the present invention;

FIG. 16 is a front view of a display screen illustrating an example of the display screen for displaying a change impact analysis result according to the second embodiment of the present invention.

DESCRIPTION OF THE PREFERRED EMBODIMENTS

Figure 3:
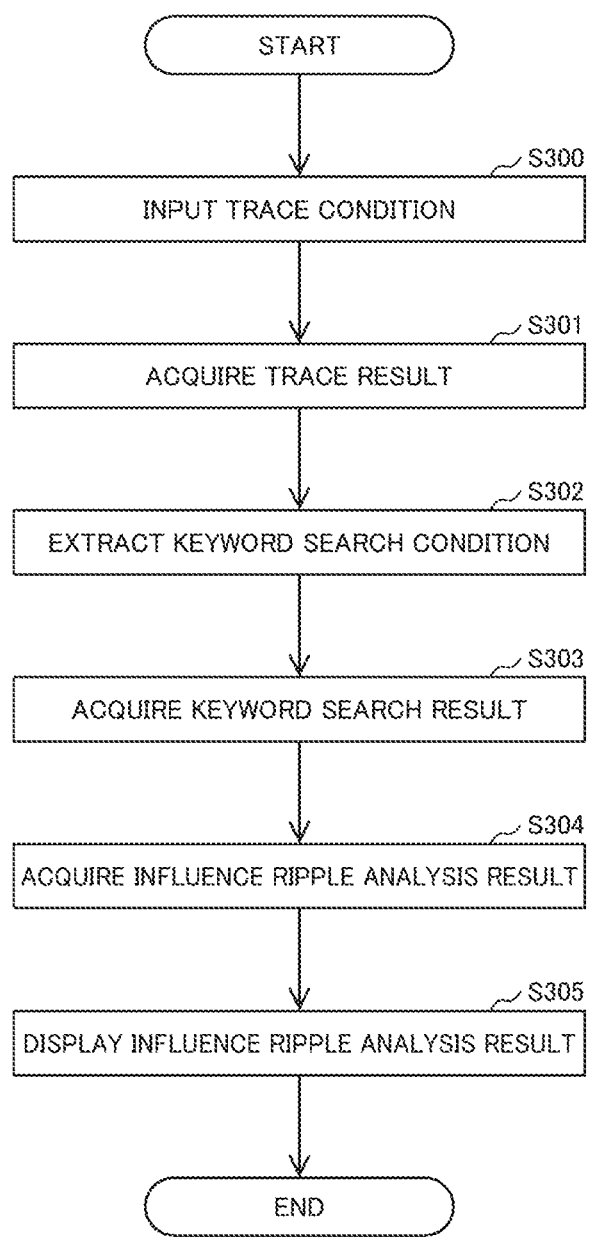
FIG. 3 is a flowchart illustrating an example of a processing flow according to the first embodiment of the present invention.

The present invention is directed to a change impact analysis device having a traceability management function that outputs a set of relation source design information and relation destination design information as a trace result with an input of the trace condition including design information representing an origin of a change impact analysis, and a keyword search function that searches the design information with an input of a keyword search condition including keywords, and outputs the design information meeting the condition as a keyword search result.

The change impact analysis device according to the present invention includes a keyword extraction function that extracts the keyword from the trace result, creates the keyword search condition, and calculates a search keyword score that is a feature value indicating whether the keyword is specific to the trace result, or not, and an influence score calculation function that calculates the influence score representing the probability of the influence for each of the design information according to the trace result, the search keyword score, and the keyword search result, and outputs a change impact analysis result including the design information and the influence score.

Moreover, the traceability management function in the change impact analysis device according to the present invention is one of means used at the time of analyzing an impact of change. The traceability management function manages related information between the design information, and the trace result that is the output of the traceability management function includes a large amount of design information high in relation with origin design information which is the design information representing an origin of the change impact analysis. For that reason, the trace result includes a large number of keywords highly related to the origin design information. In contrast, the keyword search function is also one of means used at the time of analyzing the impact of change.

Both of the traceability management function and the keyword search function suffer from a problem that misidentification and missing are included, but since the change impact analysis results obtained by both of those functions do not generally exactly match each other, the combination of those functions can reduce the misidentification and missing.

When using the keyword search function, there is a need to determine the keyword used for search. Moreover, in order to obtain the change impact analysis result high in precision, there is a need to use the keyword highly related to the origin design information.

Since the trace result includes a large number of keywords highly related to the origin design information, the change impact analysis result high in precision is obtained with the extraction of the keyword from the trace result. However, since the trace result also includes the keyword not highly related to the origin design information, there is a need to sort the keywords.

Under the above background, one feature of the present invention resides in that the search keyword score indicative of a feature value of the keyboard in the trace result is calculated with the use of a property specific to the trace result.

In addition, another feature of the present invention resides in that when the trace result and the keyword search result are combined with each other, the influence score indicative of the probability of influence is calculated with the use of the search keyword score. With the use of the influence score, the design information included in the change impact analysis result can be sorted in the order from higher in the probability of influence.

In all of the drawings for describing the present embodiment, parts having the same function are denoted by identical reference numerals or symbols, and the repetitive description will be omitted in principle. Hereinafter, embodiments of the present invention will be described in detail with reference to the accompanying drawings.

However, the present invention is not interpretively limited to the description of the embodiments described below. Those skilled in the art can easily understand that specific configurations and procedures can be modified without departing from the spirit and scope of the present invention.

[First Embodiment]

A first embodiment of the present invention will be described with reference to the drawings below.

A hardware configuration of a change impact analysis device 100 according to the present embodiment is illustrated in FIG. 1, a functional block configuration of the change impact analysis device 100 is illustrated in FIG. 2, and the present invention will be described below appropriately with reference to FIGS. 1 and 2.

As illustrated in FIG. 2, the change impact analysis device 100 is a device including a traceability management function 201 that outputs a set of relation source design information and relation destination design information as a trace result 203 with an input of a trace condition 200 including design information representing an origin of a change impact analysis, and a keyword search function 206 that searches the design information with an input of a keyword search condition 205 including the keyword, and outputs the design information meeting the condition as a keyword search result 207.

The change impact analysis device 100 also includes a keyword extraction function 204 that extracts the keyword from the trace result 203, creates the keyword search condition 205, and calculates a search keyword score that is a feature value indicating whether the keyword is specific to the trace result 203, or not, and an influence score calculation function 208 that calculates the influence score representing a probability of the influence for each of the design information according to the trace result 203, the search keyword score, and the keyword search result 207, and outputs a change impact analysis result 209 including the design information and the influence score.

The traceability management function 201, the keyword extraction function 204, and the keyword search function 206 may use a design information and related information management DB (database) 202 that stores the design information, or may deal directly with a file in which the design information is described, or the like. In addition, the design information and related information management DB 202 may store related information between the design information and type information on a design document.

Moreover, as illustrated in FIG. 1, the change impact analysis device 100 is a computing system that includes a central processing unit (CPU) 110, a display device 120, a memory 130, an input device 140, an external storage device 150, and a network communication device 160.

The CPU 110, the display device 120, the memory 130, the input device 140, the external storage device 150, and the network communication device 160 in the change impact analysis device 100 are connected to each other through a bus 170, and can transmit and receive data with respect to an internal and an external.

The traceability management function 201 acquires an input from the input device 140 and the network communication device 160. The traceability management function 201, the keyword extraction function 204, the keyword search function 206, and the influence score calculation function 208 are executed by the CPU 110. The traceability management function 201, the keyword extraction function 204, the keyword search function 206, and the influence score calculation function 208 use the design information stored in the memory 130, the external storage device 150, and the network communication device 160.

The external storage device 150 is configured by an appropriate storage medium such as a hard disk drive. The external storage device 150 stores a computer program that functions as the traceability management function 201, the keyword extraction function 204, the keyword search function 206, and the influence score calculation function 208.

The traceability management function 201 receives the trace condition 200 and outputs the trace result 203. The traceability management function 201 uses a known technique that receives origin design information that is design information representing at least an origin of an influence analysis. The trace condition 200 is an input of the traceability management function 201 including at least the origin design information.

The trace result 203 includes at least relation source design information and relation destination design information. Moreover, the trace result 203 may include the type information on the design document in which a trace score that is a value representing a probability of the trace result and the design information are described.

The keyword extraction function 204 receives the trace result 203 and outputs the keyword search condition 205 and a search keyword score. The keyword search condition 205 includes the keyword used for search. The search keyword score is a value indicative of the degree of importance of the keyword in the change impact analysis.

The keyword search condition 205 may include a search target. The search target limits a target to be searched by the keyword such as the type of the design document or items of the design document. All of the design information on the analysis target may be searched without any designation of the search target.

The keyword search function 206 receives the keyword search condition 205 and outputs the design information that matches the keyword search condition 205 as the keyword search result 207. The keyword search function 206 uses a known technique with the input of the keyword search condition 205.

The keyword search result 207 may include a search score representing the probability of the search result.

Moreover, when the keyword search function 206 can use a complicated search condition, for example, acquires the design information without any keyword, the keyword extraction function 204 may create the keyword search condition including the complicated search condition. For example, there is an embodiment in which the keyword search condition 205 that calculates the search keyword score for the keyword without any trace result 203, and searches the design information without any keyword high in the search keyword score is produced, or the like.

The influence score calculation function 208 receives the trace result 203, the keyword search condition 205, and the keyword search result 207, and outputs the change impact analysis result 209. The change impact analysis result 209 includes the design information and the influence score.

The influence score calculation function 208 calculates the influence score with the use of the trace score and the search score for the design information included in the trace result 203 and the keyword search result 207. The calculation is performed by using a formula having a positive correlation with both of the trace score and the search score. As an example of the calculation formula, there is a method of obtaining an average value of the trace score and the search score or adding those scores, or a method of using a weighted average value of those scores.

When no search score is included in the keyword search result 207, the search keyword score is used. Moreover, a formula having a positive correlation with all of the trace score, the search keyword score, and the search score may be used.

An analysis result display function 210 writes the change impact analysis result 209 on a screen, a file, or the like. An output of the analysis result display function 210 includes at least the design information, and may include information (file name, type name of the design document, and so on) for specifying the influence score, the order of the influence score, and whereabouts of the design information. Moreover, the output of the analysis result display function 210 may be sorted and output in the order from larger in the influence scores. Further, the analysis result display function 210 may receive a threshold of the influence score and output the design information so as to the one having the influence score equal to or more than the threshold is distinct.

FIG. 3 illustrates a processing flow of the change impact analysis device 100.

In S300, the trace condition 200 is acquired as an input. In S301, the trace result 203 is acquired by the traceability management function 201 on the basis of the trace condition 200. In S302, the keyword search condition 205 is extracted by the keyword extraction function 204 with the input of the trace result 203. In S303, the keyword search result 207 is acquired by the keyword search function 206 with the input of the keyword search condition 205. In S304, the change impact analysis result 209 is acquired by the influence score calculation function 208 with the input of the trace result 203, the keyword search condition 205, and the keyword search result 207. In S305, the analysis result is output to the screen, the file, or the like by the analysis result display function 210 with the input of the change impact analysis result 209.

Figure 4:
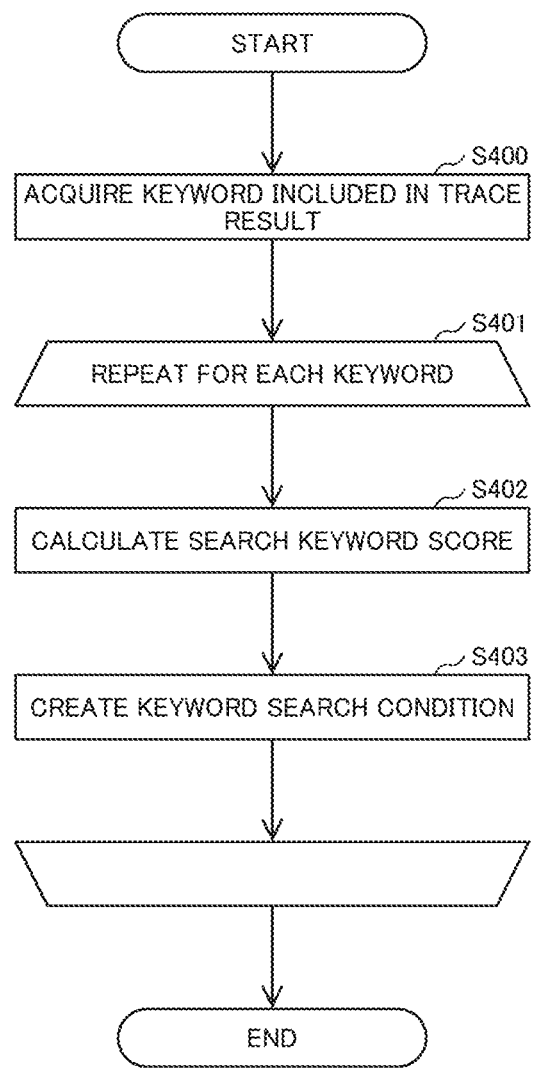
FIG. 4 is a flowchart illustrating an example of a processing flow of a keyword extraction function according to the first embodiment of the present invention.

FIG. 4 illustrates a detailed processing flow of Step S302 for extracting the keyword search condition 205 of the keyword extraction function 204. In S400, a list of the keywords included in the trace result 203 is acquired. In the acquisition of the keyword, a known technique such as distribution, a morphological analysis, or the like may be used.

In S401, S403 is repeated from S402 for each of the acquired keywords. In S402, the search keyword score is calculated. In the calculation of the search keyword score, a known technique for calculating a score representing a specificity of a target keyword such as the frequency of occurrence, the degree of concentration, or a TF/IDF is used. In S402, the design information inside and outside the trace result is compared with each other to calculate the search keyword score. In S403, the keyword search condition is created on the basis of the target keyword.

Figure 5:
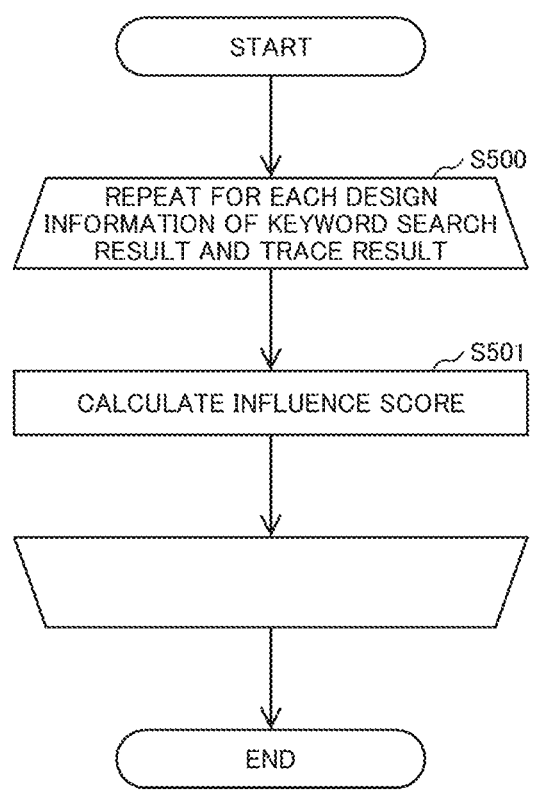
FIG. 5 is a flowchart illustrating an example of a processing flow of an influence score calculation function according to the first embodiment of the present invention.

FIG. 5 illustrates a detailed processing flow of Step S304 for acquiring an influence analysis result of the influence score calculation function 208.

In S500, S501 is repeated for each design information of the trace result 203 and the keyword search result 207. In S501, the influence score is calculated according to the trace score, the search keyword score, and the search score for the target design information.

When no trace score is included in the output of the traceability management function 201, a constant trace score is allocated to the design information included in the trace result 203. When the search score is not included in the output of the keyword search function 206, a keyword search score is applied for the search score.

In S501, the influence score may be calculated through a scoring method other than the method described in the present embodiment. For example, when multiple keywords appears in the trace result 203, if the keywords appear in the same order as a result of taking the trace in the keyword search result 207, it is determined that the same relation as a relation between the design information included in the trace result is established between the design information included in the keyword search result, and the influence score is increased, or the like.

Moreover, when the trace score or the search score is not present, the trace score may be calculated from the trace result 203, and the search score may be calculated from the keyword search result 207, in S501. For example, there are some methods. One of which is calculating the trace score focusing on a property of the trace result 203 that a direct relation with the origin design information becomes lower as being more away from the origin, a property of the trace result 203 that the design information low in the relation is likely to be included in a place with many branches. Another method is calculating the search score from the keyword search result 207 focusing on a fact that the design information is higher in the relation as the number or kind of keywords appearing in the design information is larger.

Figure 6:
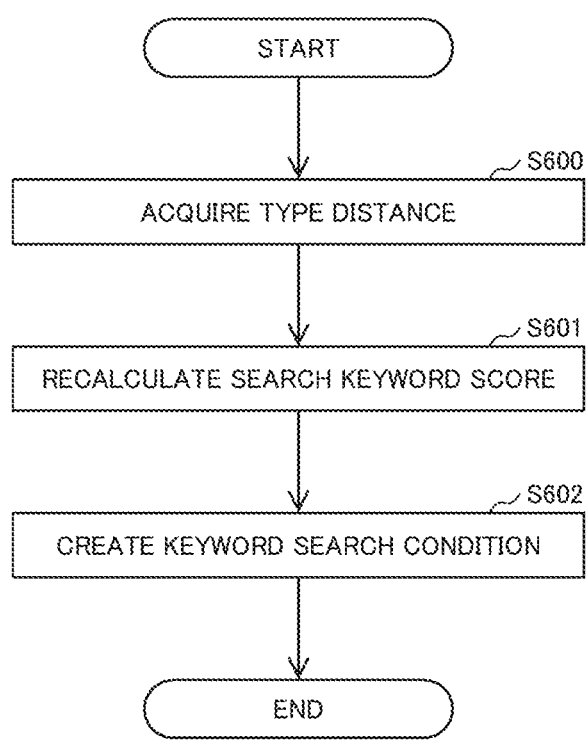
FIG. 6 is a flowchart illustrating an example of a scoring processing flow based on an appearance range of a keyword according to the first embodiment of the present invention.

FIG. 6 illustrates a detailed processing flow of search keyword score calculation Step S402 by the keyword extraction function 204. The keyword extraction function 204 acquires the type of the design document in which each keyword first appears and the type of the design document in which each keyword finally appears in putting the trace results in trace order for each type of the design documents, acquires the number of types of the design documents on a trace path connecting both of those design documents to each other, and calculates the search keyword score through a formula having a positive correlation with the number of types.

In S600, in putting the trace results 203 in trace order for each type at each stage from a conceptual stage of the design document to an individual design, the type of design document in which the target keyword first appears and the type of design document in which the target keyword finally appears are specified, and the number of types of the design documents on the trace path connecting both of those design documents to each other is acquired as a type distance. Meanwhile, when the information on the type is not included in the trace results 203, the information on the type is acquired from the design information and related information management DB 202.

In S601, the search keyword score calculated in advance in S402 is updated through a formula having a positive correlation with both of the search keyword and the acquired type distance. In S602, the keyword search condition 205 is created with the use of the target keyword. The search target is all of the design information unless particularly designated.

Figure 7:
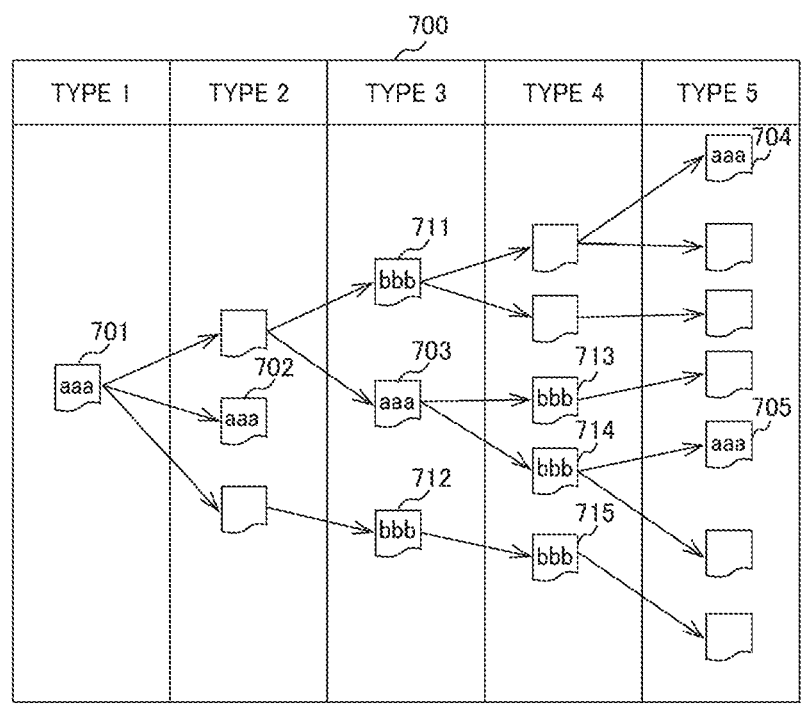
FIG. 7 is a diagram illustrating an example of a scoring based on the appearance range of the keyword according to the first embodiment of the present invention.

FIG. 7 is a table 700 illustrating an example of a scoring range based on an appearance range of the keyword. The operation of the keyword extraction function 204 will be described with reference to the table 700 of FIG. 7. The table 700 in FIG. 7 shows the trace result 203, in which the types at each stage from the conceptual stage of the design document to the individual design are put in the trace order. Each node represents the design information, and only nodes 701 to 705 in which a keyword "aaa" is included in the design information and nodes 711 to 715 in which a keyword "bbb" is included in the design information are indicated by numerals.

For each of aaa: 701 to 705 and bbb: 711 to 715, the type distance is calculated. Since aaa: 701 to 705 appear between a type 1 and a type 5, the type distance is 4. On the other hand, since bbb: 711 to 715 appear between a type 3 and a type 4, the type distance is 1. When a case in which the type distance of the target keyword is long is compared with a case in which the type distance is short, because the keywords are widely used in the trace path, aaa: 701 to 705 larger in the type distance is set to be higher in the search keyword score than bbb: 711 to 715.

Figure 8:
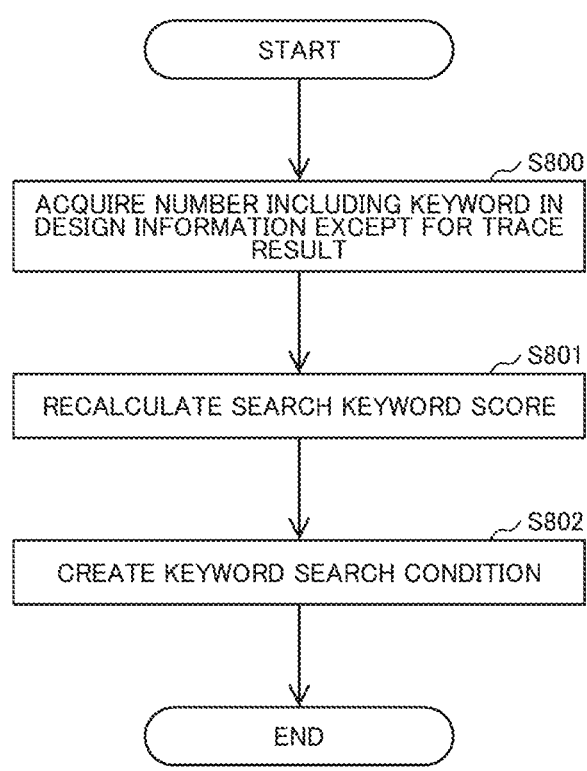
FIG. 8 is a flowchart illustrating an example of a scoring processing flow based on the number of design information out of a trace result including the keyword according to the first embodiment of the present invention.

FIG. 8 illustrates a detailed processing flow of S403 for creating the keyword search condition through the keyword extraction function 204, which relates to the scoring process based on the number of design information outside the trace result including the keyword. The keyword extraction function 204 acquires the number of design information including each keyword in the design information not included in the trace result, and calculates the search keyword score through a formula having a negative correlation with the number of design information.

In S800, the number of design information not included in the trace result 203 including the target keyword is acquired. In S801, the search keyword score calculated in advance in S402 is updated through a formula having the positive correlation with the search keyword score and having the negative correlation with the number of acquired design information. In S802, the keyword search condition 205 is created with the target keyword. The search target is all of the design information unless particularly designated.

Figure 9:
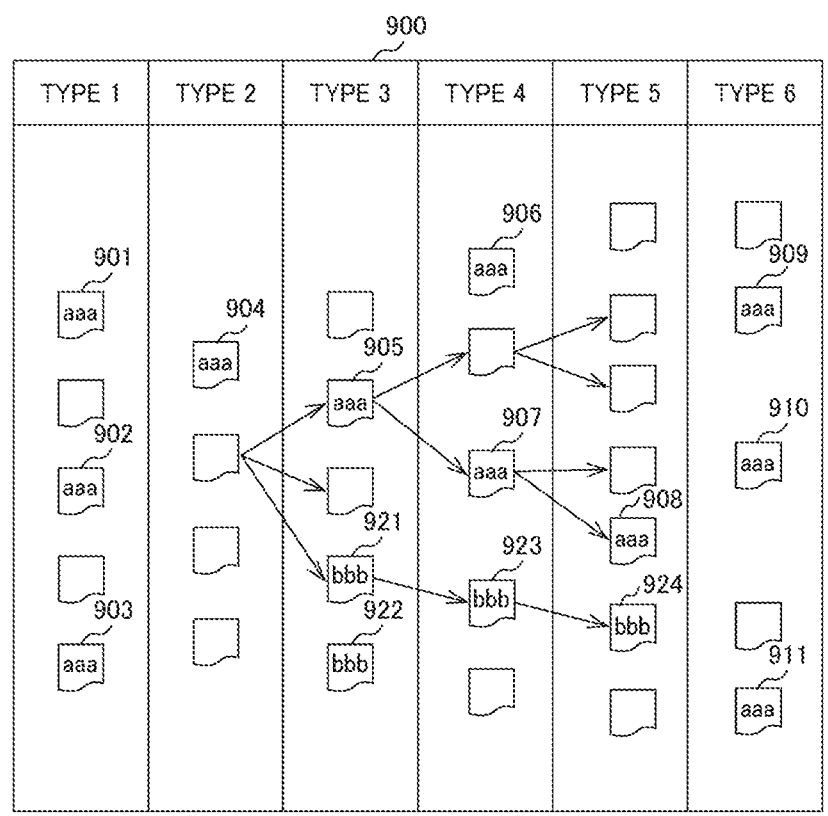
FIG. 9 is a diagram illustrating an example of the scoring based on the number of design information out of the trace result including the keyword according to the first embodiment of the present invention.

FIG. 9 is a table 900 illustrating an example of scoring based on the number of design information outside the trace result including the keyword, and the operation of the keyword extraction function 204 will be described with reference to the table 900 of FIG. 9. Each node represents the design information, and only nodes 901 to 911 in which a keyword "aaa" is included in the design information and nodes 921 to 924 in which a keyword "bbb" is included in the design information are indicated by numerals. The design information connected to each other by arrows represents the trace result 203.

In this example, for each of aaa: 901 to 911 and bbb: 921 to 924, the number of design information outside the trace result including each keyword is acquired. The aaa: 901 to 911 are 8 in the number of design information outside the trace result. In contrast, the bbb: 921 to 924 are 1 in the number of design information outside the trace result. Since the keyword included in the design information outside the multiple trace results is likely to be widely used in the design regardless of the trace result 203, the aaa: 901 to 911 larger in the number of design information including the keyword outside the trace path are set to be lower in the search keyword score than the bbb: 921 to 924.

Figure 10:
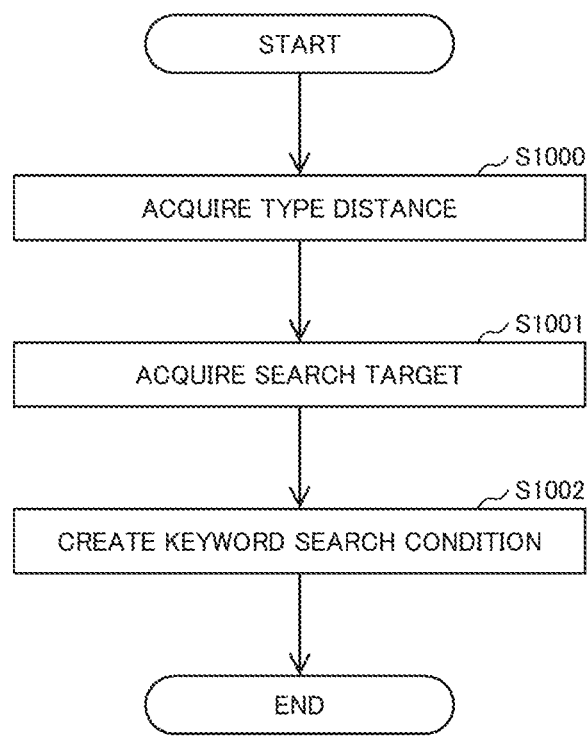
FIG. 10 is a flowchart illustrating an example of a search target narrowing processing flow focused on an appearance density of the keyword according to the first embodiment of the present invention.

FIG. 10 illustrates a detailed processing flow of Step S403 for creating the keyword search condition by the keyword extraction function 204 in a search target narrowing process focusing on an appearance density of the keyword in which the keyword search function can designate the keyword search target as the search target in the keyword search condition.

In this situation, the keyword extraction function acquires the type of the design document in which each keyword first appears and the type of the design document in which each keyword finally appears in putting the trace results in trace order for each type of the design documents, and acquires the number of types of the design documents on a trace path connecting both of those design documents to each other. The keyword extraction function receives a threshold related to the number of types, and limits the search target to a target to which the design information in which the subject keyword in the trace result appears belongs when the number of types is less than the designated threshold.

In S1000, in putting the trace results 203 in trace order for each type of the design documents, the type of design document in which the target keyword first appears and the type of design document in which the target keyword finally appears are specified, and the number of types of the design documents on the trace path connecting both of those design documents to each other is acquired as a type distance. Meanwhile, when the information on the type is not included in the trace results 203, the information on the type is acquired from the design information and related information management DB 202.

In S1001, when the acquired type distance is less than the threshold, the search target is narrowed to the type of design documents in which the design information within the trace result in which the keyword appears is present. The threshold is given as an input of the keyword extraction function 204. In S1002, the keyword search condition 205 is created with the use of the target keyword and the search target acquired in a previous step.

Figure 11:
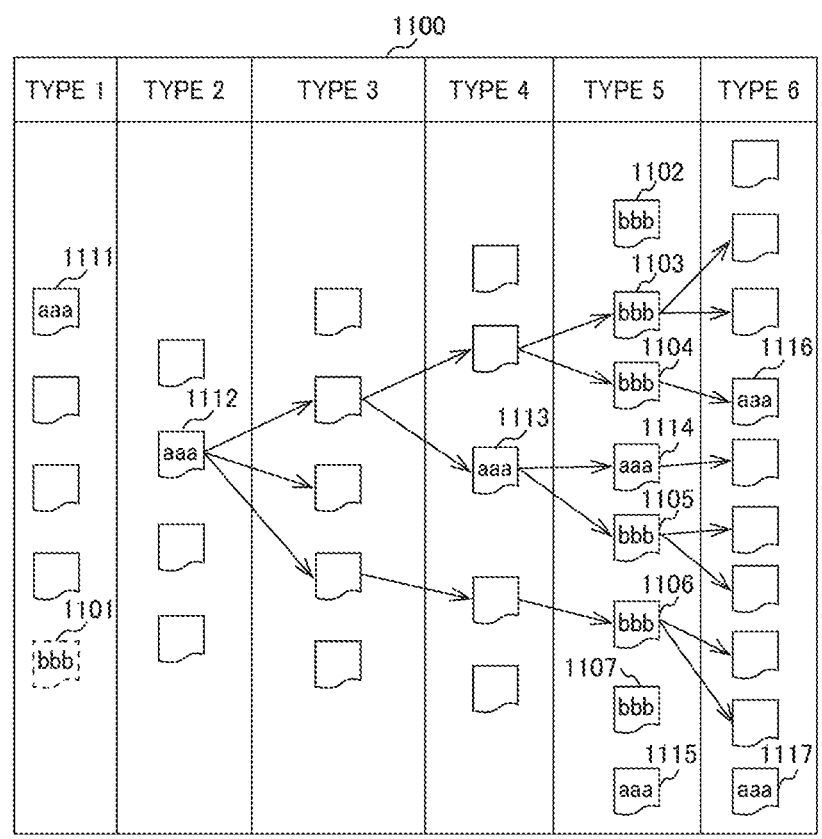
FIG. 11 is a flowchart illustrating an example of a search target narrowing processing flow focused on an appearance density of the keyword according to the first embodiment of the present invention.

FIG. 11 is a table 1100 illustrating an example of search target narrowing focused on the appearance density of the keyword, and the operation of the keyword extraction function 204 corresponding to the processing flow described with reference to FIG. 10 will be described with reference to the table 1100 of FIG. 11. Each node represents the design information, and only nodes 1111 to 1117 in which a keyword "aaa" is included in the design information and nodes 1101 to 1107 in which a keyword "bbb" is included in the design information are indicated by numerals. The design information connected to each other by arrows represents the trace result 203.

In this example, when the types 2 to 6 of the trace result are focused, the type distance is calculated for each of aaa: 1112 to 1117 and bbb: 1102 to 1107. Since the aaa: 1112 to 1117 appear between the type 2 and the type 6, the type distance becomes 4. In contrast, since the bbb: 1102 to 1107 appear in only the type 5, the type distance becomes 0.

In the case of the keyword appearing in only a small number of types, even if the same keyword appears in another type, there is a high possibility that the keyword is used in a different meaning. For that reason, when the type distance is small, the search target is narrowed to a specific type. As a result, in this example, the design information 1100 described in the change impact analysis device of the type 1 includes "bbb", but the "bbb" is not included in the keyword search result 207.

According to the present embodiment, with the combination of the trace result with the keyword search result obtained by using the keyword high in the relation with the origin design information included in the trace result, the change impact range result with less misidentification and missing is obtained.

Moreover, because the design information can be sorted in the order from higher in the probability of influence, even if the man-hours of the change impact analysis are limited, the specific influence details can be efficiently studied.

[Second Embodiment]

A second embodiment of the present invention will be described with reference to FIGS. 12 to 16.

Since a configuration of a change impact analysis device 2100 (refer to FIG. 1) is identical with the configuration described in the first embodiment with reference to FIG. 1 except for the CPU 110, an illustration of the analysis result display function 210 will be omitted. A CPU 2110 (refer to FIG. 1) in the present embodiment corresponding to the CPU 110 in the first embodiment executes functions illustrated in FIG. 12.

FIG. 12 illustrates a functional configuration of the change impact analysis device 2100 of the present embodiment with a keyword extraction function 2204, an influence score calculation function 2208, and a control function 1201.

A difference between the change impact analysis device 2100 in the present embodiment and the change impact analysis device 100 having no control function 1201 described in the first embodiment resides in that the CPU 2110 in the present embodiment corresponding to the CPU 110 is provided with the control function 1201 that inputs a change impact analysis condition 1200 and a change impact analysis result 2209, and outputs a trace condition 2200.

The change impact analysis condition 1200 includes the trace condition 2200 and a repeat completion condition, sets the trace condition 2200 and an extraction condition of the keyword extraction function 2204, and sets an influence score calculation condition in the influence score calculation function 2208.

The control function 1201 creates a new trace condition 2200 to which the design information included in the change impact analysis result 2209 is added, and repeats a change impact analysis until the change impact analysis result 2209 satisfies the repeat completion condition.

In the change impact analysis device 2100 according to the present embodiment, when a traceability management function 2201 outputs a trace score representing a probability of a trace result 2203, at least one of the keyword extraction function 2204 and the influence score calculation function 2208 calculates the search keyword score and the influence score through a formula having a positive correlation with the trace score.

Moreover, in the analysis result display function 2100 according to the present embodiment, when a keyword search function 2206 outputs the search score representing the probability of a keyword search result 2207, the influence score calculation function 2208 calculates the influence score through a formula having a positive correlation with the search score.

Further, the change impact analysis device 2100 according to the present embodiment has a control function of receiving the change impact analysis condition including the trace condition and the repeat completion condition, recording the change impact analysis result as a previous change impact analysis result, and repetitively calculating the change impact analysis until the influence score becomes equal to or less than a threshold designated under the repeat completion condition for the design information included in only the change impact analysis result in the change impact analysis result and the previous change impact analysis result.

Figure 13:
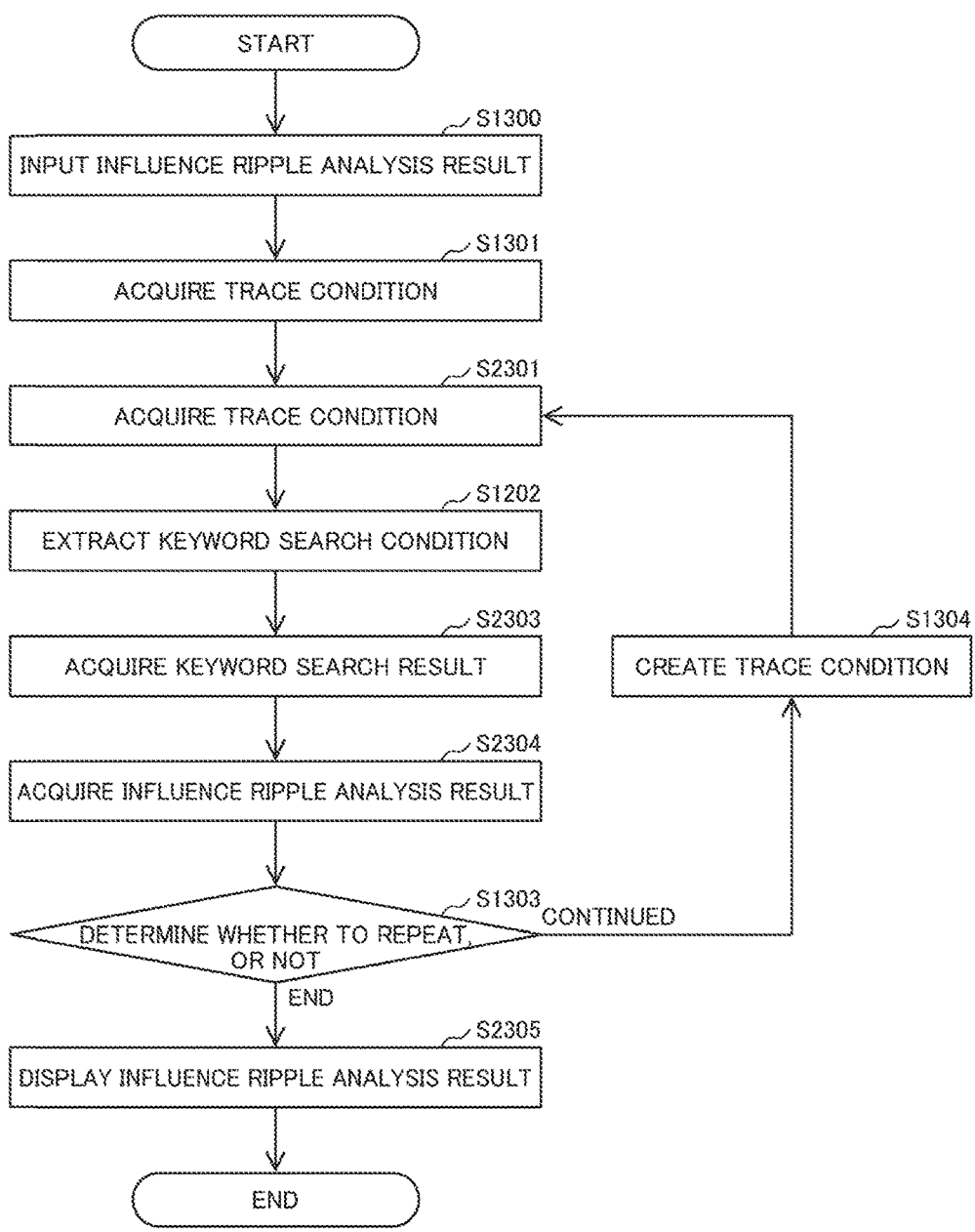
FIG. 13 is a flowchart illustrating an example of a processing flow of the change impact analysis device having the control function according to the second embodiment of the present invention.

FIG. 13 illustrates a processing flow of the change impact analysis device 2100 having the control function 1201 according to the present embodiment.

In S1300, the trace condition 2200 and the change impact analysis condition 1200 including the repeat completion condition are received. In S1301, the trace condition 2200 is acquired from the change impact analysis condition 1200 in the control function 1201.

In S2301, the trace result 2203 is acquired by the traceability management function 2201 with the input of the trace condition acquired in S1301 and the trace condition created in S1304. In S2302, a keyword search condition 2205 is extracted by the keyword extraction function 2204 with the input of the trace result 2203. In S2303, a keyword search result 2207 is acquired by the keyword search function 2206 with the use of the keyword search condition 2205. In S2304, the change impact analysis result 2209 is acquired by the influence score calculation function 2208 with the input of the trace result 2203 and the keyword search result 2207.

In S1303, it is determined by the control function 1201 whether the repeat completion condition is satisfied, or not, with the input of the change impact analysis result 2209, and if the condition is satisfied, the flow proceeds to S2305. If the condition is not satisfied, the flow proceeds to S1304.

Meanwhile, in S1303, in order to support a person's determination of whether the repeat is necessary, or not, the change impact analysis result 2209 may be displayed. Further, the person's determination result may be stored in association with the influence score or the number of design information in the change impact analysis result 2209, and used as the repeat completion condition at the time of performing a next change impact analysis.

In S2305, the change impact analysis result is output to a screen, a file, or the like by an analysis result display function 2210 with the input of the change impact analysis result 2209.

In S1304, the trace condition 2200 is created by the control function 1201 with the input of the change impact analysis result 2209. In the creation of the trace condition 2200, the design information of the change impact analysis result 2209 is set as the origin design information. In this situation, a threshold related to the influence score may be added to the change impact analysis condition 1200, and the design information of the change impact analysis result 2209 in which the influence score does not exceed the threshold, may be excluded from the origin design information of the trace condition 2200.

When the condition other than the origin design information can be designated for the trace condition 2200 to be input to the traceability management function 2201, the condition may be created in S1304. For example, there is an embodiment in which when a depth of the trace can be designated as the condition, because the number of design information included in the change impact analysis result 2209 is adjusted, if the number of keywords included in the trace result 2203 is large, the depth of the trace is reduced.

In addition, in S1304, when the number of design information included in the change impact analysis result 2209 exceeds the threshold or falls below the threshold, the origin design information when obtaining the change impact analysis result 2209 may be used as it is, and the other conditions may be changed to repeat the change impact analysis.

Figure 14:
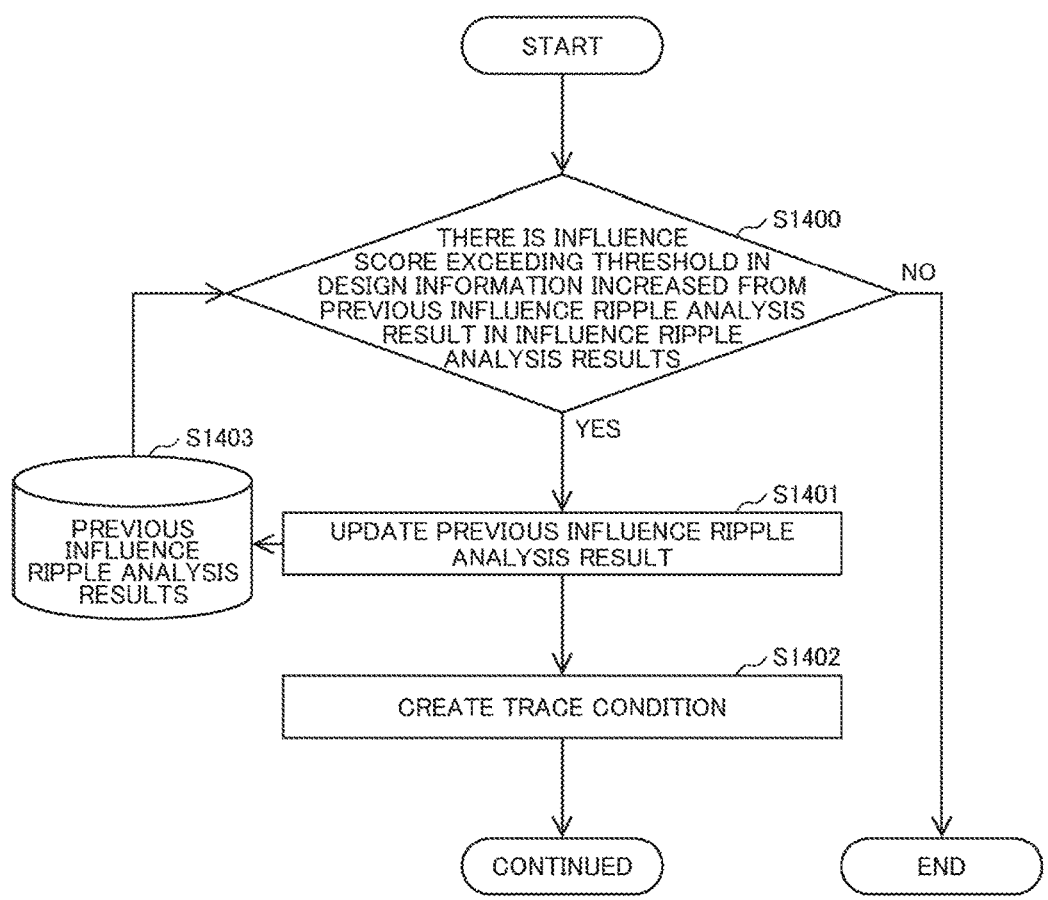
FIG. 14 is a flowchart illustrating an example of a processing flow of the control function using an influence score according to the second embodiment of the present invention.

FIG. 14 illustrates an example of a processing flow of the control function 1201 when the influence score is used in a repeat necessity determination Step S1303 of the processing flow illustrated in FIG. 13. In S1400, the design information increased by the change impact analysis result 2209 newly acquired from a previous change impact analysis result 1403 is acquired, and it is determined whether the design information having the influence score exceeding the threshold designated as the repeat completion condition is present, or not. In S1400, when the design information exceeding the threshold is present, the flow proceeds to S1401. The above process corresponds to the repeat necessity determination Step S1303 of the processing flow illustrated in FIG. 13.

In S1401, the change impact analysis result 2209 is recorded as a previous change impact analysis result 1403. In S1402, the trace condition 2200 with the design information included in the change impact analysis result 2209 as the origin design information is created to repeat the change impact analysis. This step corresponds to Step S1304 for creating the trace condition in FIG. 13.

In contrast, in S1400, when it is determined that the design information exceeding the threshold is not present, the change impact analysis is completed, and the change impact analysis result in S2305 described with reference to FIG. 13 is displayed.

Figure 15:
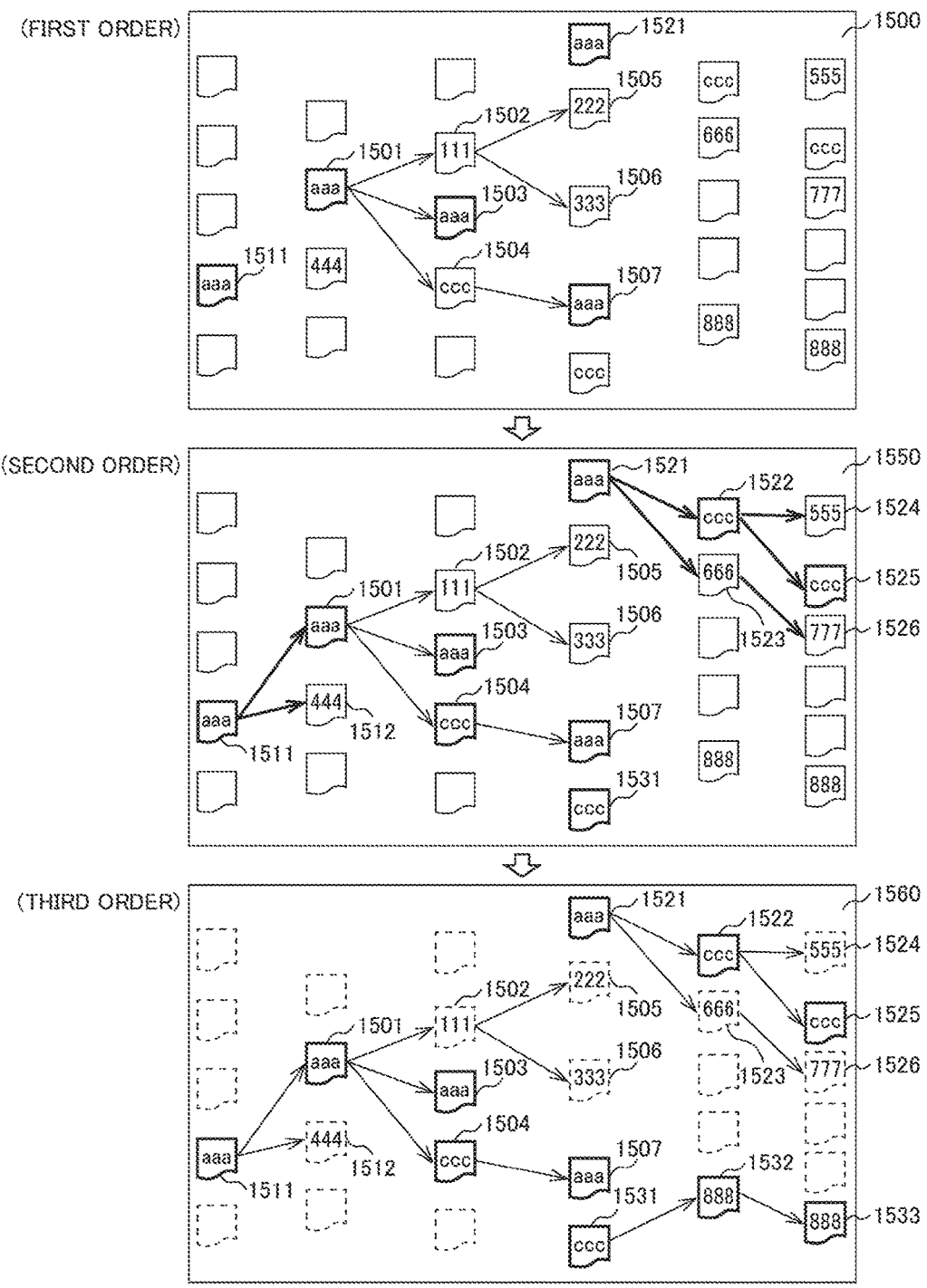
FIG. 15 is a diagram illustrating an example of the operation of the change impact analysis device having the control function according to the second embodiment of the present invention.

FIG. 15 illustrates a list of the change impact analysis results 1500, 1550, and 1560 corresponding to the table 1100 illustrated in FIG. 11 described in the first embodiment side by side, which show operation examples of the control function 1201 using the influence score. In the keyword extraction function 2204, in the keyword included in two or more design information within the trace result, the search keyword score is set as Min (the number of design information within the trace result including 100, 20* keyword). Moreover, as an influence score calculation formula of the influence score calculation function 2208, the influence score of the design information included in the keyword search result 2207 is set as the search keyword score, and the influence score of the other design information is set as 0. Further, the threshold of the influence score used in the control function 1201 is set as 50.

A list 1500 of a first change impact analysis result is an example of a result obtained by implementing the keyword search using the keyword "aaa" extracted by the keyword extraction function 2204 with the use of the trace condition 2200 with 1501 as the origin design information. As a result of the keyword search by the keyword "aaa", the design information of 1501 to 1507, 1511, and 1521 is extracted. The design information surrounded by a bold frame in the first change impact analysis result list 1500 represents the design information in which the influence score is equal to or more than 50. For example, since three of the design information 1501, 1503, and 1507 including "aaa" are present in the first trace result, the influence score of the design information including the keyword "aaa" is 60 points.

When the first change impact analysis result list 1500 is an input of the control function 1201, the design information 1501, 1503, 1507, 1511, and 1521 indicated by bold frames in which the influence score is more than 50 that is the threshold are present. Under the circumstances, the first change impact analysis result list 1500 is recorded as the previous change impact analysis result 1403, and the trace condition 2200 is created with the design information 1501, 1503, 1507, 1511, and 1521 surrounded by bold frames as the origin design information.

When the change impact analysis is again implemented with the use of the trace condition 2200, and the keyword search using the keywords "aaa" and "ccc" extracted by the keyword extraction function 2204 is implemented, the second change impact analysis result list 1550 including the new design information 1512, 1522 to 1526, and 1531 is obtained in addition to the first result. In the second change impact analysis result list 1550, the influence score of the design information 1501, 1503, 1507, 1511, and 1521 including the keyword "aaa" is 100, and the influence score of the design information 1504, 1522, and 1531 including the keyword "ccc" is 60.

When the second change impact analysis result list 1550 is an input of the control function 1201, and the design information not included in the previous change impact analysis result 1403 is acquired, the design information 1504, 1522, and 1531 including the keyword "ccc" can be acquired. In the design information 1504, 1522, and 1531 including the keyword "ccc", because the influence score is more than 50 that is the threshold, the second change impact analysis result list 1550 is recorded as the previous change impact analysis result 1403, and the trace condition 2200 is created with the design information 1501, 1503, 1507, 1511, 1521, and 1531 surrounded by bold frames as the origin design information.

When the change impact analysis is again implemented with the use of the trace condition 2200, and the keyword search using the keywords "aaa" and "ccc" extracted by the keyword extraction function 2204 is implemented, the new design information 1532 and 1533 is obtained as the third change impact analysis result list 1560 in addition to the second result. In the third change impact analysis result list 1560, the influence score of the design information 1501, 1503, 1507, 1511, and 1521 including the keyword "aaa" is 100, the influence score of the design information 1504, 1531, 1522, and 1525 including the keyword "ccc" is 80, and the influence score of the design information 1532 and 1533 including the keyword "888" is 40.

When the third change impact analysis result list 1560 is an input of the control function 1201, and the design information not included in the previous change impact analysis result 1403 is acquired, the design information 1532 and 1533 including the keyword "888" can be acquired. However, since the influence score of the design information including the keyword "888" is less than 50 that is the threshold, the change impact analysis is completed, and the change impact analysis result 2209 is output by the analysis result display function 2210.

FIG. 16 is a diagram of a screen 1600 shown by an output example for displaying the change impact analysis result when the analysis result display function 2210 has a result display function that outputs the design information higher in the influence score in the change impact analysis result. The output displayed on the screen 1600 may include at least the design information higher in the influence score. In an example, an order 1601 of the influence score, an influence score 1602, design information 1603, and a file name 1604 for specifying the whereabouts of the design information are indicated in a tabular form.

In addition, a setting unit 1605 for the threshold of the influence score is provided, and a blank line is provided between the design information equal to or more than the threshold set by the setting unit 1605 and the design information equal to or less than the threshold so as to understand the design information equal to or more than the threshold by the influence score 1602.

Meanwhile, the screen 1600 shown in an output example illustrated in FIG. 16 can be also applied to the case of the first embodiment.

According to the present embodiment, with the combination of the trace result with the keyword search result obtained by using the keyword higher in the relation with the origin design information included in the trace result, the change impact range result with less misidentification and missing is obtained.

In addition, because the design information can be sorted in the order from higher in the probability of influence, even if the man-hours of the change impact analysis are limited, the specific influence details can be efficiently studied.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. An apparatus for analyzing an impact of change for investigating a change impact range caused by a change in requirements and specifications, comprising:
a storage unit that stores design information and keywords;
an input unit that inputs a trace condition including the design information representing an origin of a change impact analysis in design conditions stored in the storage unit and the keywords stored in the storage unit;
a CPU that receives the trace condition including the design information representing the origin of the change impact analysis and the keywords from the input unit, and calculates an influence score representing a probability of the influence caused by the change in the requirements and the specifications for each of the design information on the basis of a trace result obtained with the use of the trace condition, a search keyword score which is a feature value indicating whether the keyword is specific to the trace result, and a keyword search result which is design information that meets a keyword search condition; and
a display unit that outputs a result calculated by the CPU, wherein
the input unit further inputs a change impact analysis condition including a trace condition and a repeat completion condition, and
the CPU records the influence score as a previous calculation influence score, and repetitively calculates the influence score until the influence score becomes equal to or less than a threshold designated under the repeat completion condition for the design information included in only an influence score newly calculated among the influence score newly calculated and an influence score previously calculated.

2. The apparatus for analyzing an impact of change according to claim 1, wherein
the CPU includes:
a traceability management function unit that outputs a set of relation source design information and relation destination design information included in the design information as the trace result with the use of the trace condition including the design information representing the origin of the change impact analysis input from the input unit;
a keyword extraction function unit that extracts the keywords from the trace result output from the traceability management function unit, creates the keyword search condition, and calculates the search keyword score that is the feature value indicating whether the keyword is specific to the trace result;
a keyword search function unit that searches the design information with the use of the keyword search condition created by the keyword extraction function unit, and outputs the design information meeting the condition as the keyword search result;
an influence score calculation function unit that calculates the influence score representing the probability of the influence for each of the design information according to the trace result output from the traceability management function unit, the search keyword score calculated by the keyword extraction function unit, and the keyword search result output from the keyword search function unit, and outputs a change impact analysis result including the design information and the influence score.

3. The apparatus for analyzing an impact of change according to claim 2, wherein
the keyword extraction function unit extracts the keywords from the trace result output from the traceability management function unit and creates the keyword search condition.

4. The apparatus for analyzing an impact of change according to claim 2, wherein
the traceability management function unit outputs a trace score indicative of the probability of the trace result, and
the keyword extraction function unit and the influence score calculation function unit calculates the search keyword score and the influence score through a calculation formula having a positive correlation with the trace score when the traceability management function unit outputs the trace score indicative of the probability of the trace result.

5. A method for analyzing an impact of change for investigating a change impact range caused by a change in requirements and specifications, comprising:
inputting a trace condition including design information representing an origin of a change impact analysis in design conditions stored in a storage unit and keywords stored in the storage unit from an input unit to a CPU;
calculating an influence score representing a probability of an influence caused by a change in the requirements and the specifications on the basis of the trace condition including the design information representing the origin of the change impact analysis and the keywords input from the input unit for each of the design information in the CPU on the basis of a trace result obtained with the use of the trace condition, a search keyword score which is a feature value indicating whether the keyword is specific to the trace result, and a keyword search result which is design information that meets a keyword search condition;
outputting a result calculated by the CPU to a display unit;
inputting a change impact analysis condition including a trace condition and a repeat completion condition to a computer;
recording the calculated influence score as a previous calculation influence score in the computer; and
in the step of calculating the influence score, repetitively calculating the influence score until the influence score becomes equal to or less than a threshold designated under the repeat completion condition for the design information included in only an influence score newly calculated among the influence score newly calculated and an influence score previously calculated.

6. The method for analyzing an impact of change according to claim 5, wherein the step of calculating includes,
obtaining a set of relation source design information and relation destination design information in a traceability management function unit of the CPU as the trace result with the use of the trace condition including the design information representing the origin of the change impact analysis input from the input unit,
creating the keyword search condition in a keyword extraction function unit of the CPU from the keyword input from the input unit,
searching the design information in a keyword search function unit of the CPU with the use of the keyword search condition created by the keyword extraction function unit, and the design information meeting the condition is obtained as the keyword search result, extracting the keyword in the keyword extraction function unit from the trace result output from the traceability management function unit, the keyword search condition is created, and the search keyword score that is the feature value indicating whether the keyword is specific to the trace result, is calculated, and calculating the influence score representing the probability of the influence in the influence score calculation function unit of the CPU for each of the design information according to the trace result output from the traceability management function unit, the search keyword score calculated by the keyword extraction function unit, and the keyword search result output from the keyword search function unit to output a change impact analysis result including the design information and the influence score.

7. The method for analyzing an impact of change according to claim 6, wherein the step of extracting keyword including, extracting the keyword in the keyword extraction function unit from the trace result output from the traceability management function to create the keyword search condition.

8. The method for analyzing an impact of change according to claim 6, wherein in the step of obtaining a set of relation source design information and relation destination design information in a traceability management function unit, outputting a trace score indicative of the probability of the trace result, and wherein in the step of extracting the keyword in the keyword extraction function unit and the step of calculating the influence score representing the probability of the influence in the influence score calculation function unit, calculating the search keyword score and the influence score through a calculation formula having a positive correlation with the trace score when the traceability management function unit outputs the trace score indicative of the probability of the trace result.

9. A method for analyzing an impact of change for investigating a change impact range caused by a change in requirements and specifications with the use of a computer, comprising:

inputting a trace condition including design information representing an origin of a change impact analysis to the computer to obtain a set of relation source design information and relation destination design information included in the design information as a trace result;

extracting the keyword from the trace result to create the keyword search condition, extracting the keyword from the trace result to calculate a search keyword score that is a feature value indicating whether the extracted keyword is specific to the trace result, is calculated;

searching the design information with the use of the keyword search condition to obtain the design information meeting the keyword search condition as a keyword search result;

calculating an influence score representing a probability of the influence for each of the design information according to the trace result, the search keyword score, and the keyword search result;

outputting a change impact analysis result including the design information and the influence score from the computer;

inputting a change impact analysis condition including a trace condition and a repeat completion condition to the computer;

recording the calculated influence score as a previous calculation influence score in the computer; and in the step of calculating the influence score, repetitively calculating the influence score until the influence score becomes equal to or less than a threshold designated under the repeat completion condition for the design information included in only an influence score newly calculated among the influence score newly calculated and an influence score previously calculated.

10. The method for analyzing an impact of change according to claim 9, further comprising:

obtaining a trace score indicative of the probability of the trace result; and in the step of calculating, the search keyword score and the influence score are calculated through a calculation formula having a positive correlation with the trace score.

* * * * *